(12) United States Patent
Nishikawa et al.

(10) Patent No.: US 6,449,907 B2
(45) Date of Patent: Sep. 17, 2002

(54) VEHICLE DOOR AND PROCESS OF ASSEMBLING THE VEHICLE DOOR

(75) Inventors: Ikuo Nishikawa; Chikashi Kawamoto; Kenichi Ogawa; Noboru Shouno, all of Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/790,313

(22) Filed: Feb. 21, 2001

(30) Foreign Application Priority Data

Feb. 29, 2000 (JP) ......................................... 2000-053666

(51) Int. Cl.[7] ................................................. B06J 5/04
(52) U.S. Cl. ....................................... 49/502; 296/146.7
(58) Field of Search ..................... 49/501, 502, DIG. 2; 296/146.7

(56) References Cited

U.S. PATENT DOCUMENTS

| | | | | |
|---|---|---|---|---|
| 4,769,951 A | * | 9/1988 | Kaaden ......................... | 49/502 |
| 5,535,553 A | * | 7/1996 | Staser et al. .................. | 49/502 |
| 5,820,191 A | * | 10/1998 | Blakewood et al. ..... | 296/146.7 |
| 5,855,096 A | * | 1/1999 | Staser et al. .................. | 49/502 |
| 5,890,321 A | * | 4/1999 | Staser et al. .................. | 49/502 |
| 5,937,584 A | * | 8/1999 | Salmonowicz et al. ........ | 49/502 |
| 6,000,959 A | * | 12/1999 | Curtindale et al. ............ | 49/502 |
| 6,301,835 B1 | * | 10/2001 | Pfeiffer et al. ................. | 49/502 |
| 6,367,202 B1 | * | 4/2002 | Reed et al. .................... | 49/502 |

FOREIGN PATENT DOCUMENTS

JP  09-156374  6/1997

* cited by examiner

Primary Examiner—Jerry Redman
(74) Attorney, Agent, or Firm—Brooks & Kushman, P.C.

(57) ABSTRACT

A vehicle door includes an outer door panel, an inner door panel formed with an aperture and a plastic mounting panel to which functional devices of the vehicle door and door parts are installed and which is installed to the inner door panel to enclose the aperture thereof, the mounting panel having a plastic panel, a plastic structural part appendant to the plastic panel, and a breakable joint connecting the plastic structural part to the plastic panel as one whole piece. The structural part is separated from the plastic panel by breaking away the joint from the plastic panel and installed to the plastic panel after having installed the plastic panel to the vehicle door in order to cover an access opening which provides access to the interior of the vehicle door for assembling for example an exterior door handle and window glass.

6 Claims, 12 Drawing Sheets

VEHICLE DOOR AND PROCESS OF ASSEMBLING THE VEHICLE DOOR

BACKGROUND OF THE PRESENT INVENT

1. Field of the Invention

The present invention relates to a lightweight door of a vehicle which is easy to assemble and comprises a decreased number of parts and a method of assembling the door.

2. Description of the Related Art

Typically, vehicle doors are made up of a door panel assembly comprising a steel inner door panel and a steel outer door panel to which various functional parts and devices, such as a window regulator and a door lock/unlock mechanism, are directly mounted. In recent years, in order to decrease the number of internal constituent parts of such a vehicle door and to lighten such a door, it has been proposed to use a plastic panel to which various functional parts and devices are mounted. The plastic panel is attached to the steel inner door panel such that it closes up an opening of the inner door panel. One of the vehicle doors is known from, for example, Japanese Unexamined patent application No. 9-157374.

Because using the plastic mounting panel Prepared separately from the door panel assembly allows the inner door panel to take even various complicated forms without restraint, it is possible to eliminate fixing members such as clips that are used to fix internal constituent parts and devices to the door panel assembly. Further, because using the plastic panel allows internal constituent parts and devices to be disposed at various locations, a significant effect is produced in terms of increasing the degree of freedom for laying out the internal constituent parts The plastic panel is formed by press molding or injection molding. In the case where one piece panel member is used to form the almost entire part of the inner door panel as disclosed in Japanese Unexamined patent application No. 9-157374, it is almost inevitable that the inner door panel is large in size. In consequence, when using a plastic panel member that is attached to a door panel assembly, a large size of mold is necessary. This needs a large amount of plastic material and results in application of considerably high molding pressure or injection pressure. It is undesirable to use a large size of molding equipment and a large amount of material for simply preparing the one piece plastic panel in light of production efficiency.

SUMMARY OF THE INVENTION

It is therefore an object of the present invention to provide a vehicle door which includes a plastic panel to be installed thereto, the plastic panel being formed with high efficiency of production It is another object of the present invention to provide a process of assembling a vehicle door which includes a plastic panel installed to the vehicle door, with high efficiency of assembling.

The above objects of the present invention are accomplished by a vehicle door comprising an outer door panel, and an inner door panel formed wit an aperture, a mounting panel to which functional devices of the vehicle door and door parts are mounted and which is installed to the inner door panel to close up the aperture of the inner door panel. The mounting panel comprises a plastic panel formed in conformity with the aperture of the inner door panel, a plastic structural part appedant to the plastic panel, and a breakable joint connecting the plastic structural part to the plastic panel which are formed as one piece by, for example, injection molding. The plastic structural part is separated from the plastic panel by breaking away the joint from the plastic panel during installing work of the mounting panel to the inner door panel.

The plastic structural part is one of the door parts that are mounted or fitted to the mounting panel, such as a cover for covering an opening formed in the plastic panel which provides an access to the inside of the vehicle door for assembling the vehicle door. The plastic structural part is mounted or fitted to the plastic panel desirably after installation of the plastic panel to the inner door panel.

The inner door panel has a substantial wall section forming part of a side wall of a passenger compartment of the vehicle and the plastic structural part before separation from the plastic panel occupies a location where it overlaps the substantial wall section of the inner door panel when the mounting panel is installed.

According to the vehicle door of the present invention, the plastic mounting panel is formed as one piece including a structural part which is separated from the plastic mounting plate and installed to the plastic mounting panel after having been assembled to the vehicle door. This configuration of the plastic mounting panel enables putting a large amount of plastic material and a large size molding apparatus to efficient use, so as to increase the productivity of the mounting panel.

Owing to the configuration of the plastic mounting panel that the plastic structural part before separation from the plastic panel occupies a location where it overlaps the substantial wall section of the inner door panel when the mounting panel is installed, while the plastic mounting panel is formed so as to have the plastic panel in conformity with the aperture of the inner door panel, the plastic structural part is formed as one of the door parts at a location where the plastic panel is in non-occupation. As a result, the plastic mounting panel can be configured in the form of substantially rectangular flat plate, so tat it is easy to pile up a number of the plastic mounting panels and to convey a stack of the plastic mounting panels safely and reliably, without separating the appendant parts. For example, in the case where the plastic panel has a shape like a generally rectangle with one of the corners cut off, the plastic structural part is formed in a generally rectangular panel by locating the plastic structural part as an appedant part to the plastic panel at the cutoff corner. Moreover, because the plastic structural part is one of the door parts that be installed to the mounting panel, the plastic structural part can be always along with the plastic panel until the plastic panel is installed to the door panel and is separated from the plastic panel immediately before the plastic structural part is intended to be installed to the plastic panel. In consequence, it is not feared that the plastic struck part is missing before assembling such as during conveyance thereof.

In the case where the plastic structural part is formed as a cover for covering an opening formed in the plastic panel which provides an access to the inside of the vehicle door for assembling the vehicle door, the plastic structural part is always along with the plastic panel until the assembling work is finished, so as to make it reliable to cover the access opening in the plastic panel, thereby completing the vehicle door.

According to the process of assembling the vehicle door of the present invention, the plastic struck part is separate and then installed to the plastic panel during assembling work of the vehicle door or after the plastic panel has been installed to the door panel. Desirably, the plastic structural part is separated and then installed to the plastic panel after having installed the plastic panel to the door panel. In consequence, the plastic structural part is always along with the plastic panel until the assembling work is finished, so that it is not feared that the plastic structural part is missing before assembling such as during conveyance thereof, which makes it reliable to install the plastic structural part to the plastic panel in order to complete the vehicle door. The process eliminates the fear that the plastic structural part is missing and provides reliable installation of the plastic structural part to the plastic panel.

BRIEF DESCRIPTION OF THE DRAWINGS

The above and other objects and features of the present invention will be clearly understood from the following description with respect to the preferred embodiments thereof when considered in conjunction with the accompanying drawings, in which.

DETAILED DESCRIPTION OF THE PREFERRED EMBODIMENT

Although the following description is directed to a front door of a vehicle by way of example, the present invention is applicable to a rear door and a back door with the same effects.

Figure 1:
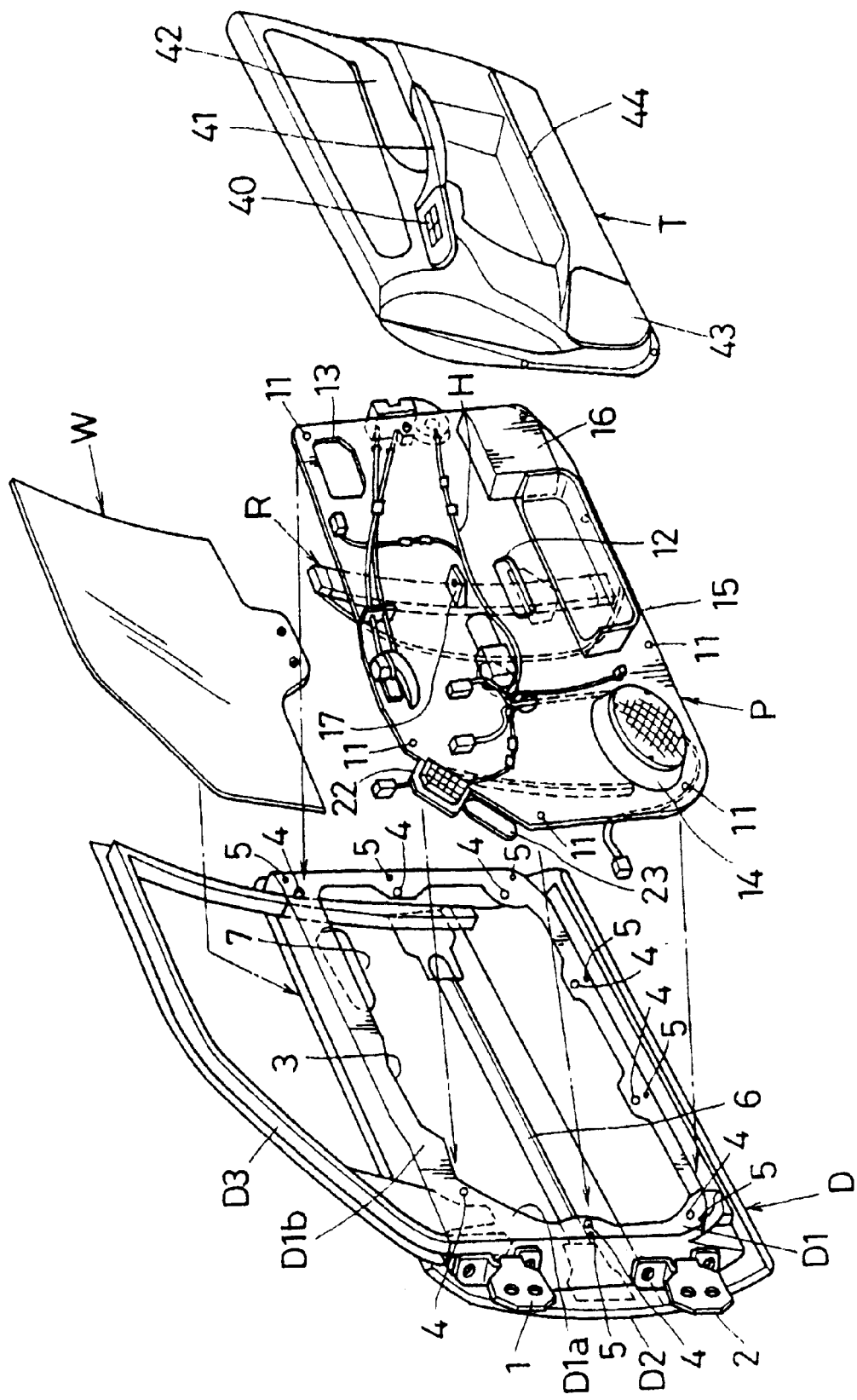
FIG. 1 is an exploded view of a vehicle door in accordance with a prefereed embodiment of the present invention.
Figure 2:
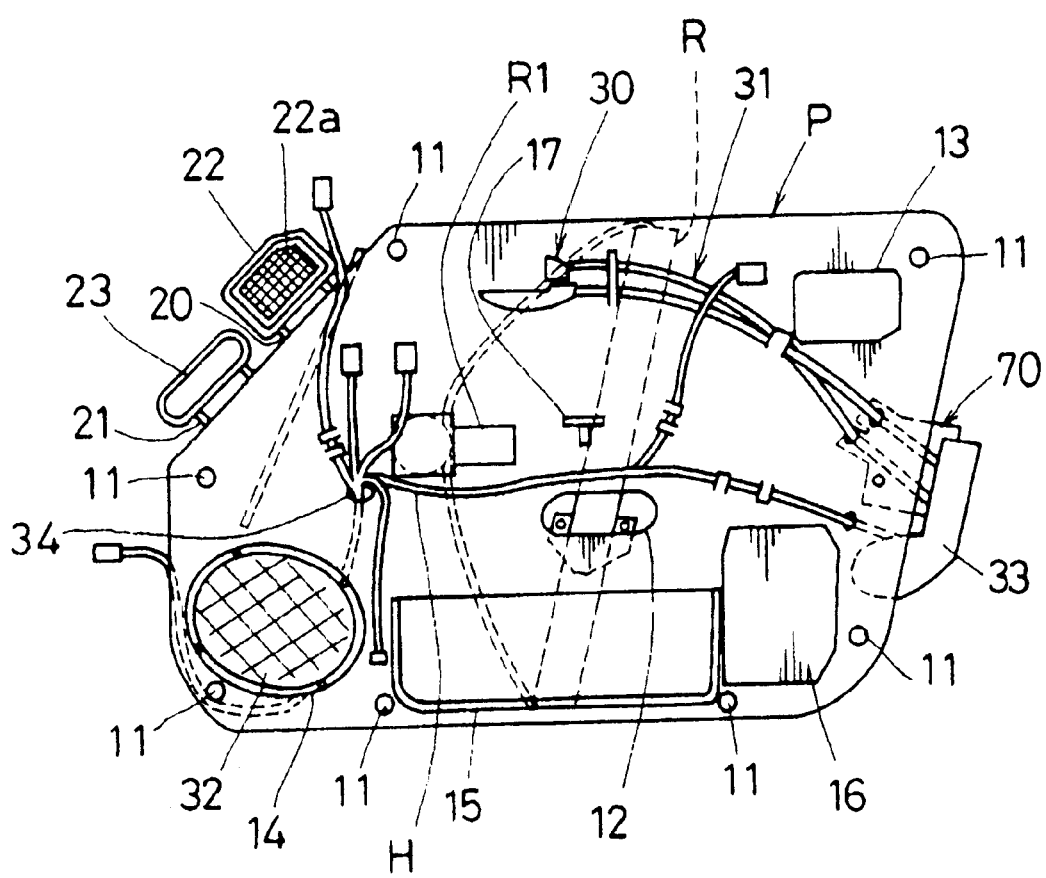
FIG. 2 is a front view of a plastic panel as viewed from a passenger compartment.
Figure 3:
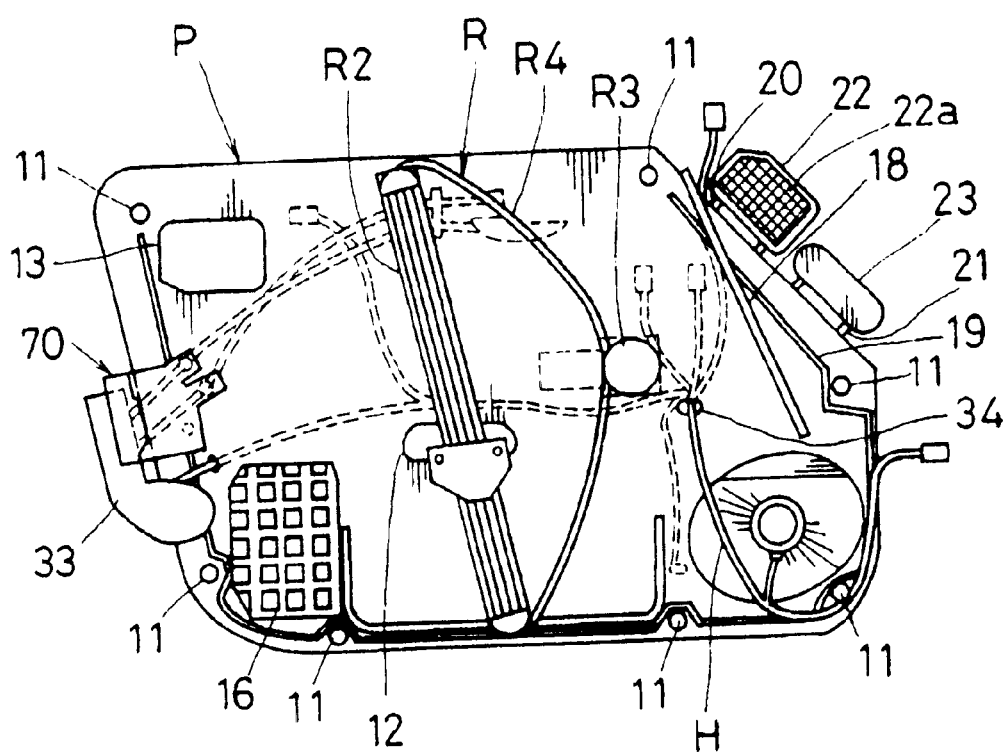
FIG. 3 is a rear view of the plastic panel as viewed from the outside of the passenger compartment.

Referring to the drawings in detail, and, in particular, to FIGS. 1 to 3 showing a front door of a vehicle )which will be referred to as a vehicle door for simplicity) in accordance with a preferred embodiment of the present invention, the vehicle door is made up of a door panel sub-assembly D comprising a steel inner panel D1, a steel outer panel D2 and a steel window sash D3, a plastic mounting panel P, and a trim unit T which forms a side wall of a passenger compartment The window sash D3, which is shaped such as to have a front part inclined rearward as viewed from the front of the vehicle, receives an window glass W therein. The door panel D at its front end is provided upper and lower hinges 1 and 2. The inner panel D1 has a generally rectangular aperture 3 formed below a belt line and has a front top corner D1a uncut An upper mounting panel Portion D1b above the belt line and integral with the uncut part D1a provides the inner panel D1 with structural rigidity at least necessary for an inner panel. The inner panel D1 is formed with a plurality of holes 4 arranged around the aperture 3 for fastening clips and set screws (not shown) for attaching the plastic mounting panel P and the trim unit T to the door panel sub assembly D.

The door panel sub-assembly D is equipped with an impact bar 6 extending in a lengthwise direction of the vehicle between the inner panel D1 and the outer panel D2 in order to provides the door panel subassembly D with increased rigidity against side impact thereon. The outer panel D2 is provided with an exterior door handle 7 at its rear top corner thereof The plastic mounting panel P has an overall shape in almost conformity to the aperture 3 of the inner panel D1. The plastic mounting panel P is formed with a plurality of holes 11 arranged along the peripheral margin so as to correspond in position to the holes 4 of the inner panel D1. Further, the plastic mounting panel P at its center portion is formed with an opening 12 for an access to the inside of the door panel sub-assembly D for installing the window glass W to a window regulator R The plastic mounting panel P at its rear top corner is formed with an opening 13 for an access to the inside of the door panel subassembly D for connecting a wire cable and its associated parts to the exterior door handle 7. The plastic mounting panel P is further formed with a speaker mount 14, a pocket 15 and a side crash pad 16, all of which are arranged in the lengthwise direction at a lower portion of the plastic plate P and project toward the passenger compartment, and a bracket 17 positioned at a center thereof The trim unit T is fixed to the plastic mounting panel P. and hence the door panel subassembly D, through the bracket 17.

As shown in detail in FIG. 3 showing an appearance of the plastic mounting panel P as viewed from the outside of the passenger compartment, the plastic mounting panel P is formed and provided with various constituent parts including at least a window glass guide rail 18, a sealing member 19, and access opening covers 22 and 23. Specifically, the window glass guide rail 18 is attached to a front portion of the plastic mounting panel P so as to guide up and down movement of the window glass W The sealing member 19, which is made of, for example, waterproof rubber strip, attached to the plastic mounting panel P so as to extend along the periphery except an upper side of the plastic mounting panel P The access opening cover 22 is formed as an appendant part to the plastic mounting panel P at a front upper cutaway corner so as to be easily separated from the plastic mounting panel P by braking away joints 20 after it has been attached to the plastic mounting panel P to cover up the access opening 13. Similarly, the access opening cover 23 is formed as an appendant part to the plastic mounting panel P at the front upper cutaway corner so as to be easily separated from the plastic mounting panel P by breaking away joints 21 after it has been attached to the plastic mounting panel P to cover up the access opening 12. The access opening cover 22 is formed with a shock absorbing lattice structure comprising ribs 22a and installed to the plastic mounting panel P such that, when the plastic mounting panel P is installed to the door panel sub-assembly D, the access opening cover 22 absorbs impact from the exterior door handle 7.

The plastic mounting panel P is additionally provided with various functional parts and devices including at least an interior door handle 30, a handle linking cables 31, a motor R1 of the window regulator R and a front speaker 32 which are at the inner side of the plastic mounting panel P as viewed from the passenger compartment, and a guide rail R2, a drum pulley R3 and a cable R4 forming parts of the window regulator R and a door latch unit 33 (schematically depicted in FIG. 2) which are at the outer side of the plastic mounting panel P as viewed from the passenger compartment These functional parts and devices are attached to the plastic mounting panel P before the plastic mounting panel P is installed to the door panel sub-assembly D. Specifically, the interior door handle 30 is installed to an upper portion of the inner side of the plastic mounting panel P as viewed from the passenger compartment The handle cable 31 extends from the interior door handle 30 and the door latch unit 33. The motor RI is installed to the center portion of the plastic mourning panel P. The front speaker 32, which forms a part of an audio system, is mounted to the speaker mount 14. The guide rail R2, the drum pulley R3 and the cable R4 are installed to the center portion of the plastic mounting panel P The door latch unit 33, which is engaged by a body striker (not shown), is installed to a rear portion of the plastic mounting panel P The plastic mounting panel P is additionally provided with harness H for supplying electric power to various electric constituent parts. The harness extend passing through a center hole 34, front half portions thereof extending on the outer side of the plastic mounting panel P as depicted by a solid line in FIG. 3 and rear half portions thereof extending on the inner side of the plastic mounting panel P as depicted by solid line in FIG. 2.

As seen in FIG. 1, the trim unit T is installed to the door panel sub-assembly D after the plastic mounting panel P is isntalled so as to form a side wall of the passenger compartment The trim unit T is formed and provided with various parts and devices including a switch unit 40 having a plurality of switches for actuating at least a power driven window regulator and a power-driven door lock/unlock mechanism, an assist grip 41 and an arm rest 42 extending behind the switch unit 40. In addition, a speaker cover 43 and a pocket wall 44 are formed as appendant parts to the trim unit T. The speaker cover 43 is fitted on the speaker mount 14 so as to cover the front speaker 32. The pocket wall 44 closes one side of the pocket 15 facing the passenger compartment.

The window glass W is installed to the door panel subassembly D after the plastic mounting panel P is installed Specifically, the window glass W is inserted into the door panel sub-assembly D, i.e., between the inner panel D1 and the outer panel D2, from the side of the window sash D3, and then, installed to the window regulator R on the plastic mounting panel P.

Details of the respective parts and devices of the vehicle door will be described below in conjunction with FIGS. 4 through 19.

Figure 4:
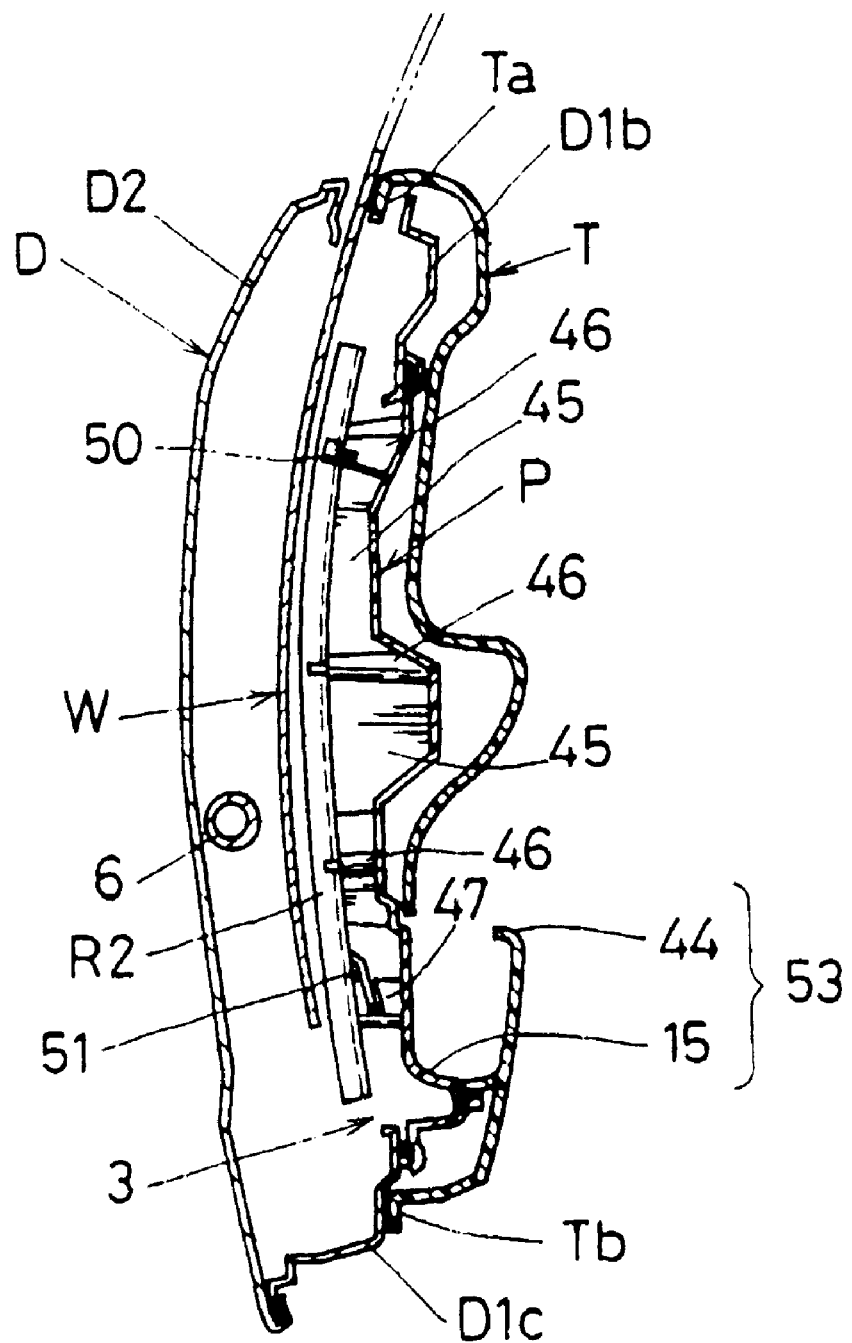
FIG. 4 is a longitudinal-sectional view of a completed vehicle door taken along a vertical center line.

FIG. 4 shows a completed vehicle door in longitudinal-section along a vertical center line thereof In an interior space of the door panel subassembly D formed between the inner panel D1 and the outer panel D2 there is disposed the guide rail R2 of the window rear R installed to the plastic mounting panel P such as to extend in a direction of height of the vehicle. The window glass W is located on the outer side of the guide rail R2 so as to be guided by the guide rail R2. The impact bar 6 is disposed on the outer side of the window glass W such as to extend in the lengthwise direction. In order to provide the passenger compartment with reliable watertightness, the waterproof sealing strips 19 are firmly aught between the plastic mounting panel P and the inner panel D1, specifically the upper mounting panel Portion D1b and a lower mounting panel Portion D1c below the aperture 3 of the inner panel D1, respectively, so as to block the 3. The guide rail R2 is supported from the outer side thereof by the a fixing rib 45, a fixing boss 46 and an engaging boss 47 fixedly attached to or formed as an integral part with the plastic mounting panel P and is installed to the plastic mounting panel P through a fixing bolt 50 at an upper extreme end and a L-shaped tongue 51 at a lower extreme end thereof. The trim unit T is inserted at its upper end Ta between the upper mounting panel Portion D1b of the inner panel D1 and the window glass W and is fixed at its lower end Tb to the lower mounting panel Portion D1c of the inner panel D1 so as thereby to be installed to the door panel sub-assembly D and to cover the plastic mounting panel P. The pocket wall 44 is formed as an integral part with the trim unit T and forms an inner side Wall of the pocket 15 when the trim unit T is installed to the door panel sub-assembly D so as thereby to complete a box-shaped pocket 53 for small articles.

Figure 5:
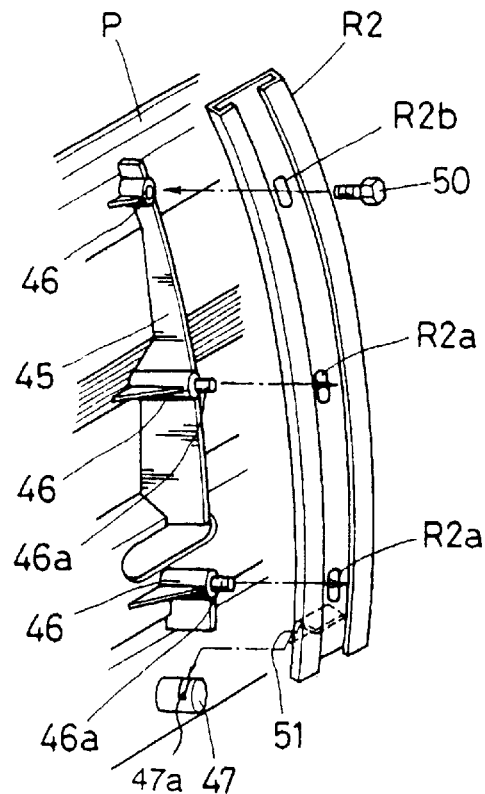
FIG. 5 is an exploded view of a window glass regulator tail of a window regulator.

As shown in FIG. 5, in the installing process of installing the guide rail R2 of the window regulator R to the plastic mounting panel P, after temporarily keeping the guide rail R2 in position relative to the plastic mounting panel P first by inserting the L-shaped tongue 51 of the guide rail R2 into a slot 47a of the engagement boss 47, positioning and engaging pins 46a extending from the fixing bosses 46 are engaged within holes R2a formed in the guide rail R2, respectively. Finally, the fixing bolt 50 is passed through one of the holes R2b and fastened into one of the fixing bosses 46 so as thereby to firmly fix the guide rail R2 to the plastic mounting panel P. in this manner, the assembling work of the guide fail R is made easy.

Figure 6:
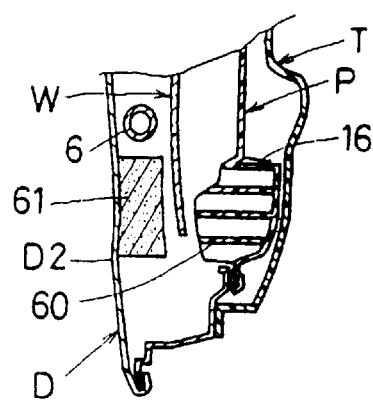
FIG. 6 is a longitudinal-sectional view of a rear lower part of the completed vehicle door.

FIG. 6 shows a rear lower part of the completed vehicle door in longitudinal-section As shown, the side crash pad 16 installed to the plastic mounting panel P projects from a transverse position where the window glass W is located to a transverse position where the trim unit T is located in a direction from the exterior to the interior of the vehicle. The side crash pad 16 is formed with impact absorption ribs 60 configured like cells in the interior thereof which are arranged so as to open at their outside ends. The side crash pad 16 thus configured receives energy due to an impact from a side crash pad 61 secured to the outer panel D2 upon an occurrence of a side crash.

Figure 7:
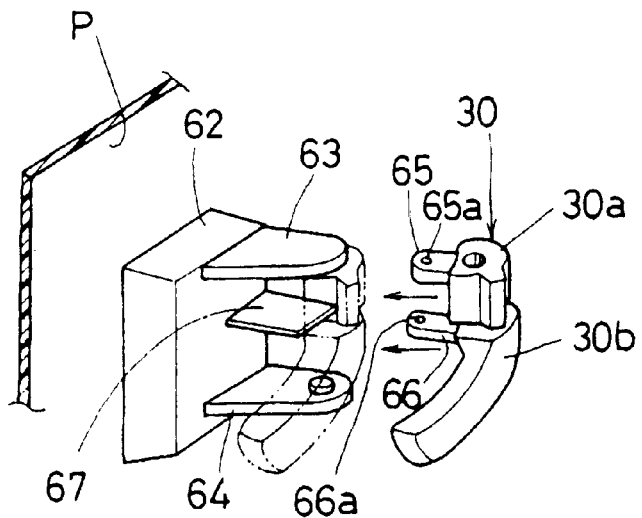
FIG. 7 is an exploded view of an interior door handle.

FIG. 7 is the interior door handle 30 which is exploded for the purpose of explaining a step of installing the interior door handle 30 to the plastic mounting panel P As shown, the interior door handle 30 is directly secured to a base block 62 formed as an integral part with the plastic mounting panel P without employing separately provided parts. The interior door handle 30 comprises a door lock knob 30a and a door release or unlock knob 30b. These knobs 30a and 30b are put between upper and lower brackets 63 and 64 extending from the base block 62 of the plastic mounting panel P as depicted by a double-dotted line so as to turn about a vertical axis in opposite directions. The door lock knob 30a has a coupling arm 65 as an integral part therewith and formed with a coupling hole 65a in which a bent end 31c of a cable rod 31a (see FIG. 8) of the handle linking cable 31 is fitted Similarly, the door unlock knob 30b has a coupling arm 66 as an integral part therewith and formed with a coupling hole 66a in which a bent end 31d of a cable rod 31b (see FIG. 8) of the handle linking cable 31 is fitted. The base block 62 is formed with an intermediate partition 67 extending in parallel to and between the upper and lower brackets 63 and 64.

Figure 8:
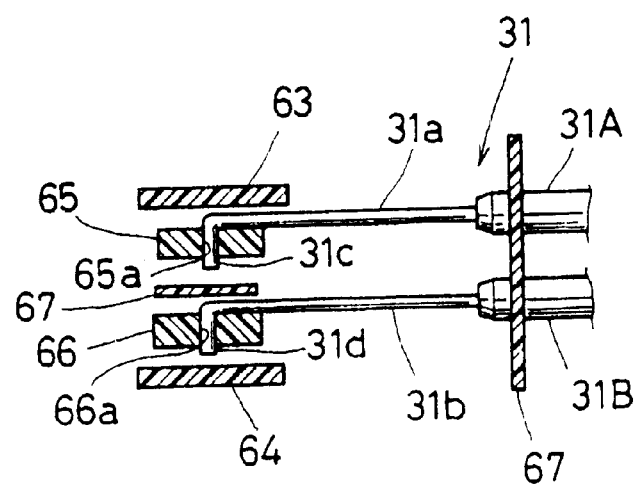
FIG. 8 is a cross-sectional view showing a linkage structure between an interior door handle and handle linking cable.

As depicted in detail in FIG. 8, the handle lining cable 31 is coupled to the interior door handle 30 installed to the base block 62 of the plastic mounting panel P The handle linking cable 31 comprises the cable rods 31a and 31b and cable rod guide and protect ion sheaths 31A and 31B. The cable rod 31a at its extreme end 31c is bent at approximately a right angle and fitted in the coupling hole 65a of the coupling arm 65. The cable rod 31b at its extreme end 31d is bent at approximately a right angle and fitted in the coupling hole 66a b of the coupling arm 66. In the step of coupling the handle linking cable 31 to the interior door handle 31, namely the door lock knob 30a and the door unlock knob 30b, the extreme bent ends 31c and 31d of the respective cable rods 31a and 31b are fitted in the coupling holes 65a and 66a of the coupling arms 65 and 66, respectively, first Then, the interior door handle is put and pivotally mounted between the upper bracket 63 and the lower bracket 64 so as to locate the coupling arm 65 of the door lock knob 30a between the upper bracket 63 and the intermediate partition 67 and the coupling arm 66 of the door unlock knob 30b between the intermediate partition 67 and the lower bracket 64. The handle linking cable coupling structure makes the upper bracket 63 function as a stopper for preventing the cable rod 31a from slipping off from the coupling arm 65 of the door lock knob 30a Similarly, the handle linking cable coupling structure makes the intermediate partition 67 function as a stopper for preventing the cable rod 31b from slipping off from the coupling arm 66 of the coupling arm 66 of the door unlock knob 30b. The cable rod guide and protection sheaths 31A and 31B are fixedly supported by a bracket 67 of the plastic mounting panel P.

As described above, the handle linking cable coupling structure thus coupling the cable rod 31 to the interior door handle 30 provides reliable power transmission from the door lock knob 30a and the door unlock knob 30b to the door latch unit 33 (see FIG. 2).

Figure 9:
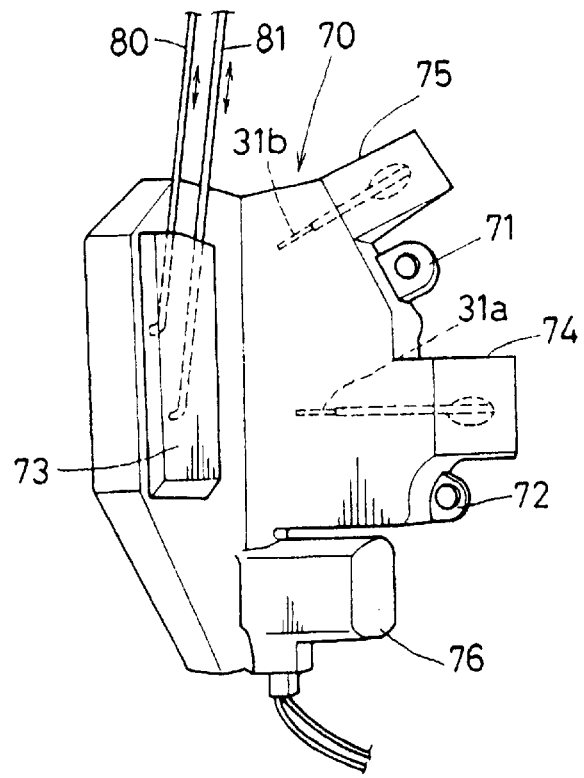
FIG. 9 is a perspective view of a door latch unit cover.

FIG. 9 shows a door latch unit cover 70 by which the door latch unit 33 is covered and protected. The door latch unit cover 70, which is made of a plastic as one piece and has an outer shape in approximately conformity with an outer shape of the door latch unit 33, is fixed to the plastic mounting panel P through fixing brackets 71 and 72 formed as integral parts with the plastic mounting panel P The door latch unit cover 70 may be formed separately from the plastic mounting panel P or may be formed as an appendant part to the plastic mounting panel P. The door latch unit cover 70 comprises four integral sections made up as one piece. Specifically, a cover section 73 is located at one of opposite sides of the door latch unit cover 70 to cover a cable rod of a handle linking cable 80 linking the exterior door handle 7 and a cable rod of a cylinder linking cable 81 linking a key cylinder (not shown). A cover section 74 is located at another side of the door latch unit cover 70 to cover a cable rod 31a of the handle linking cable 31 linking the door lock knob 30a. A cover section 75 is located above the cover section 74 to cover a cable rod 31b of the handle linking cable 31 linking the door unlock knob 30b. A cover section 76 is located at lower end of the door latch unit cover 70 to cover a motor (not shown) of the power-driven door latch unit 33.

Figure 10:
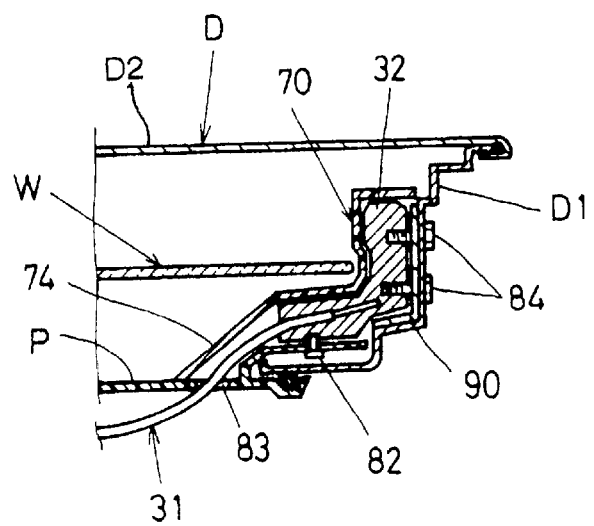
FIG. 10 is a transverse-sectional view of a door latch unit and its associated parts.

FIG. 10 shows the door latch unit 33 and its associated parts covered by the door latch unit cover 70 in cross-section. The door latch unit 33 is secured to the plastic mounting panel P from the outer side on which the window glass W and the outer panel D2 are located. The door latch unit cover 70 protects the door latch unit 33 from an access from the outside of the vehicle with an intention to run away with the vehicle. The handle linking cable 31 (see FIGS. 1 and 2) extending from the interior door handle 30 along the plastic mounting panel P passes through an hole 83 formed in rear part of the plastic mounting panel P so as to extend to the door latch unit 33 crossing the plastic mounting panel P. The hole 83 in the plastic mounting panel P is covered by the door latch unit cover 70. Because the most part of the handle linking cable 31 lays on the inner side of the plastic mounting panel P and because the handle linking cable 31 is linked with the door latch unit 33 within the door latch unit cover 70, the handle linking cable 31 is protected from an access from the outside of the vehicle with an intention to run away with the vehicle. As shown in FIG. 10, a generally L-shaped reinforcement 90 is welded, or otherwise secured, to the inner panel D1 at a position where the door latch unit 33 is secured by fixing bolts 84 in order to provide reliable fixing stiffness of the door latch unit 33 to the inner panel D1.

Figure 11:
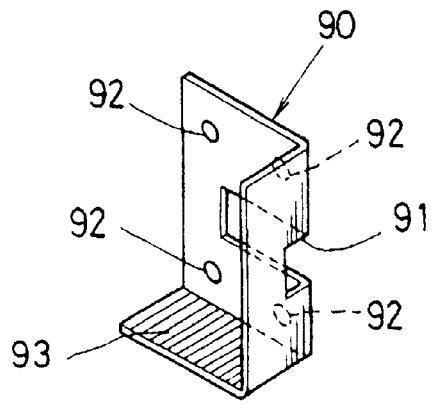
FIG. 11 is a perspective view of a reinforcement plate.

Referring to FIG. 11 showing the L-shaped reinforcement 90 in detail, the L-shaped reinforcement 90, which is made of a steel plate, is formed with a generally rectangular center opening 91 through which the body striker passes across when locking the vehicle door and four bolt holes 92 around the rectangular opening 91 through which bolts are inserted and fastened to the inner panel D1 in order to fix the door latch unit 33 to the inner panel D1. The L-shaped reinforcement 90 at its lower end is additionally formed with a bottom rack 93. While the door latch unit 33 itself is comparatively heavy, it is previously supported on the bottom rack 93 of the L-shaped reinforcement 90, so that the work of installing the plastic mounting panel P to the door panel sub-assembly D is made easy, as a result of which, a man-hour in assembling the front door is considerably reduced.

Figure 12:
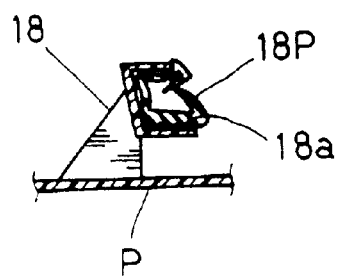
FIG. 12 is a cross-sectional view of window glass guide.

FIG. 12 shows the window glass guide rail 18 of the plastic mounting panel P in cross-section. While a window glass guide rail is conventionally provided separately from the inner panel D1, however, in the vehicle door of the present invention, the window glass guide rail 18 is configured as an integral part with the plastic mounting panel P. This integrated configuration allows the window glass guide rail 18 to be easily completed by simply fitting a packing strip 18P in a groove 18a of the guide rail 18.

Figure 13:
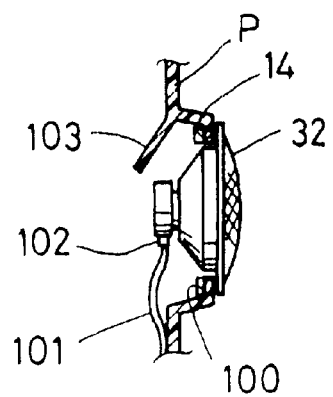
FIG. 13 is a cross-sectional view showing a speaker mounting structure.

FIG. 13 shows the front speaker 32 attached to the speaker mount 14 of the plastic mounting panel P in cross-section. The speaker mount 14 projects toward the passenger compartment The front speaker 32 is fitted in an opening reinforced by a ring 100 of the speaker mount 14 and is firmly secured by, for example, fixing bolts (not shown) to the speaker mount 14. The speaker 32 at its back is provided with a coupler 102 to which a lead wire 101 extending the harness H is connected so as to receive audio signals. The plastic mounting panel P is formed with a splash guard 103 extending behind and above the front speaker 32 so as to prevent electric parts associated with the front speaker 32 from, for example, raindrops.

Figure 14:
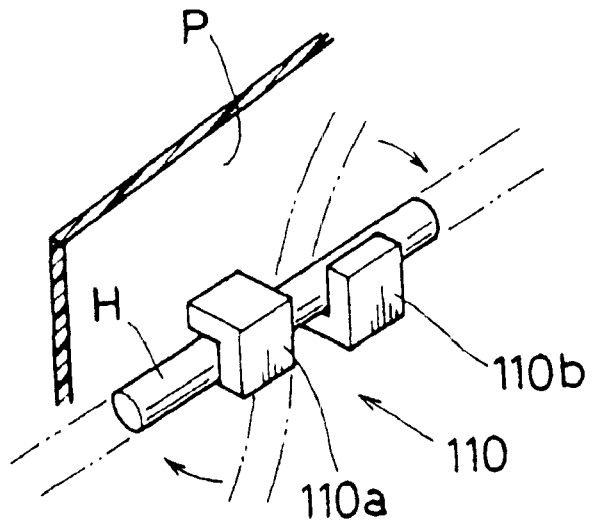
FIG. 14 is a perspective view showing a harness fitting structure.
Figure 15:
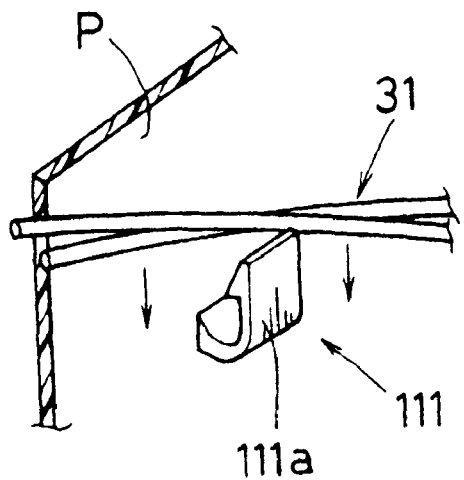
FIG. 15 is a perspective view showing a cable fitting structure.

FIGS. 14 and 15 show anchor structures of the plastic mounting panel P for anchoring the harness H and the handle linking cable 31. As shown in FIG. 14, the plastic mounting panel P is formed with a harness anchor 110 as an integral part therewith for anchoring the harness H. The harness anchor 110 comprises a pair of L-shaped anchor lugs 110a and 110b arranged oppositely in vertical direction. In order to anchor the harness H, the harness H is positioned substantially vertically and put between the L-shaped anchor lugs 110a and 110b. Then, the harness H at opposite parts is bent in opposite directions as shown by arrows so as to bring the opposite parts into engagement with the L-shaped anchor lugs 110a and 110b, respectively. On the other hand, as shown in FIG. 15, the plastic mounting panel P is formed with a cable anchor 111 as an integral part therewith for anchoring the handle linking cable 31. The cable anchor 111 comprises a generally J-shape anchor lug 111a. In order to anchor the handle linking cable 31, the handle linking cable 31 is inserted between the plastic mounting panel P and the J-shaped anchor lug 111a from above and seat it on the bottom oft he J-shaped anchor lug 111a.

The anchor structure comprising the harness anchor 110 and the cable anchor 111 formed as integral parts with the plastic mounting panel P eliminates any necessity to use anchor clips which have been conventionally prepared separately from the plastic mounting panel P. Therefore, this anchor structure makes wiring work quite simple and easy.

Figure 16:
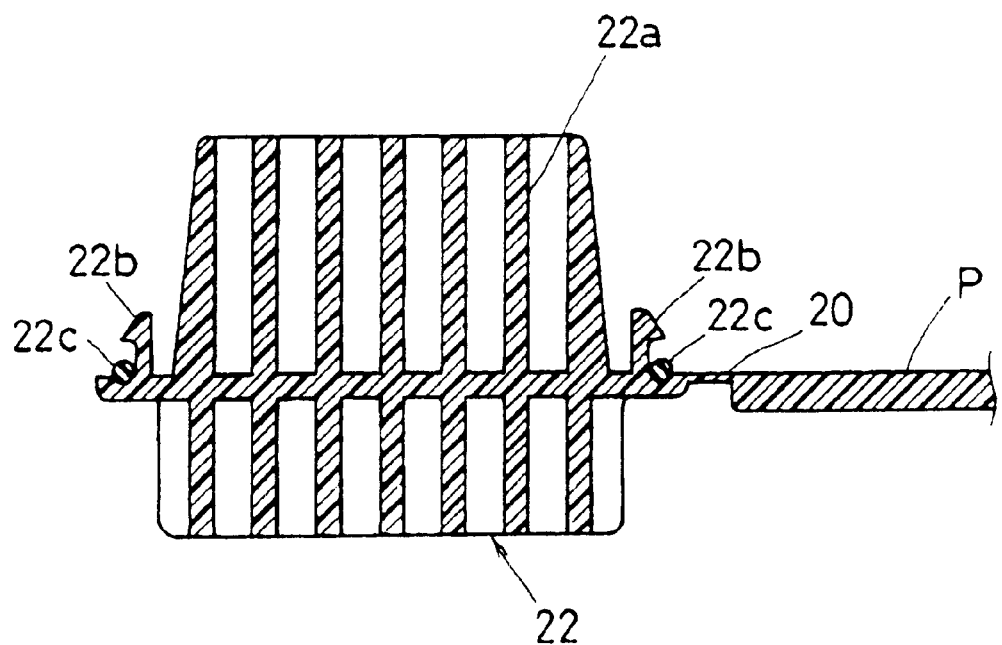
FIG. 16 is a cross-sectional view of the plastic panel with a cover for an exterior door handle access opening left joined.
Figure 17:
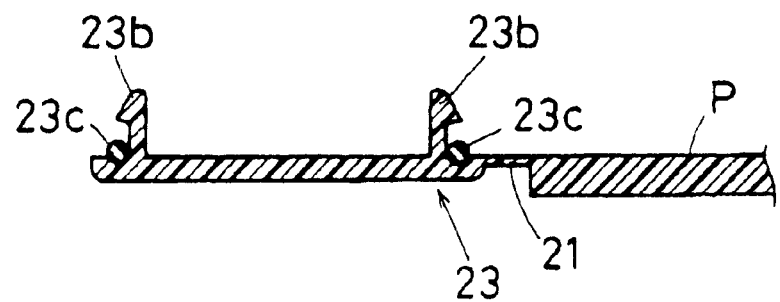
FIG. 17 is a cross-sectional view of the plastic panel with a cover for a window glass access opening left joined.

FIGS. 16 and 17 show the access opening covers 22 and 23 before being separated from the plastic mounting panel P, respectively. As was previously described, the plastic mounting panel P is prepared as one piece having the access opening covers 22 and 23. The plastic plate P is installed to the door panel sub-assembly D with the access opening covers 22 and 23 left joined to the plastic mounting panel P. After having attached the plastic mounting panel P to the door panel subassembly D, the access opening cover 22 is separated from the plastic mounting panel P by breaking away the joints 22a and attached to the plastic mounting panel P in position to cover up the access opening 13 which provides an access to the exterior door handle 7 for connecting the handle linking cable 31 to the interior door handle 7. Similarly, after attaching the plastic panel tot he door panel subassembly D, the access opening cover 23 is separated from the plastic mounting panel P by breaking away the joints 23a and attached to the plastic mourning panel P in position to cover up the access opening 12 which provides an access to the inside of the door panel sub-assembly D for installing the window glass W to the window regulator R. Specifically, as shown in FIG. 16, the access opening cover 22 is formed as an appendant part joined to the plastic mounting panel P by breakable joints 20. The access cover 22 has a shock absorbing lattice structure comprising a plurality of ribs 22a extending in opposite directions and arranged in a lattice pattern. The access opening cover 22 is formed with a hook 22b extending toward the inner panel D1 in conformity with the access opening 13 so as to surround the shock absorbing lattice structured. A rubber packing ring 22c is seated in an annular recess formed around the shock absorbing lattice structure before or after having separated the access opening cover 22 from the plastic mounting panel P and before attaching it to the plastic mourning panel P to cover up the access opening 13. As shown in FIG. 17, the access opening cover 23 is formed as an appendant part joined to the plastic mounting panel P by breakable joints 21. The access cover 23 is formed with a hook 23b extending toward the inner panel D1 in conformity with the access opening 12. A rubber packing ring 23c is seated in an annular recess formed around the hook 23b before or after having separated the access opening cover 23 from the plastic mounting panel P and before attaching it to the plastic mounting panel P to cover up the access opening 12.

Figure 18:
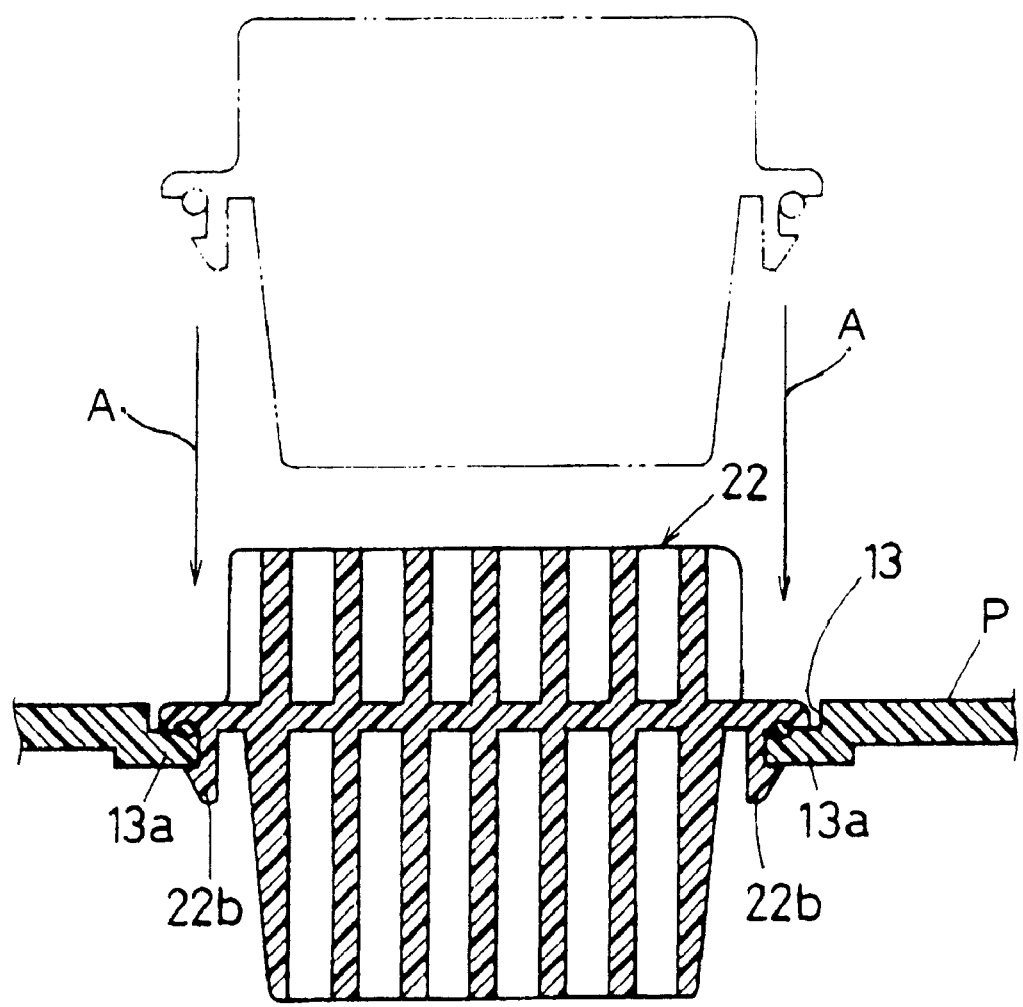
FIG. 18 is a cross-sectional view of the cover fitted in the exterior door handle access opening.
Figure 19:
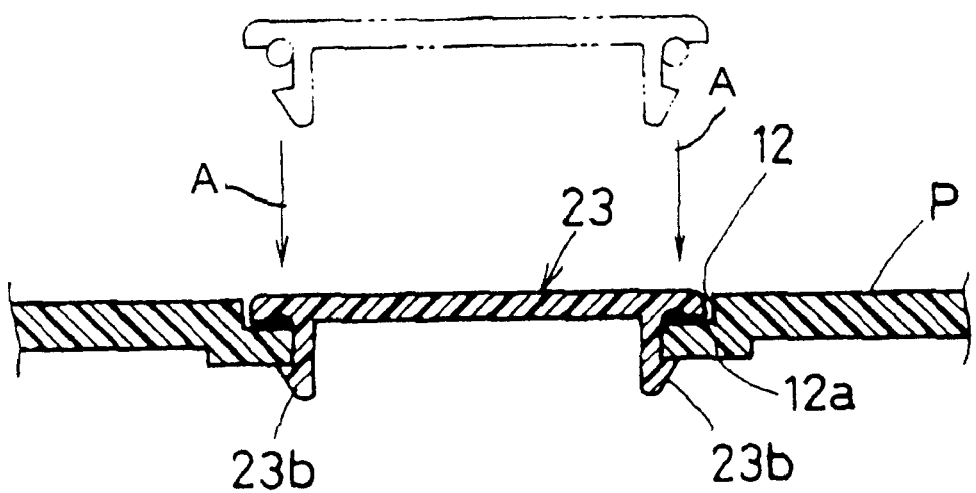
FIG. 19 is a cross-sectional view of the cover fitted in the window glass access opening.

FIGS. 18 and 19 show the access covers 22 and 23 are attached in position to cover up the access openings 13 and 12, respectively. As shown in FIG. 18, the access opening cover 22 is forced toward the plastic mounting panel P so as to bend and fit the hook 22b into the access opening 13 from the side of the passenger compartment as indicated by arrows A. When the hook 22a passes across the periphery 13a of the access opening 13, the hook 22a bends back and engages with the periphery 13a of the access opening 13. In this manner, the access opening cover 22 is easily attached in position to the plastic mounting panel P and is prevented from coming off from the access opening 13. Similarly, as shown in FIG. 19, the access opening cover 23 is forced toward the plastic mounting panel P so as to bend and fit the hook 23b into the access opening 12 from the side of the passenger compartment as indicated by arrows A When the hook 23a passes across the periphery 12a of the access opening 12, the hook 23a bends back and engages with the periphery 1a of the access opening 12, so that the access opening cover 23 is easily attached in position to the plastic mounting panel P and is prevented from coming off from the access opening 12.

As described above, the plastic mounting panel P having the access openings 12 and 13 provides easy accesses to the exterior door handle 7 and the window regulator R for door assembling work and enables easily closing the access openings 12 and 13 after the door assembling work. Further, the rubber packing rings 22c and 23c provides reliable watertightness of the passenger compartment In assembling the vehicle door constructed as above, the plastic mounting panel P having the access opening covers 22 and 23 joined thereto by the breakable joints 20 and 21 is formed by injecting a large amount of plastic material into a large size mold at a stretch The plastic mounting panel P is conveyed to a door assembling station. The door panel subassembly D is prepared separately from the plastic mounting panel P at another station and conveyed to the door assembling station Because the plastic mounting panel P is configured in the form of substantially rectangular flat plate, it is easy to pile up a plurality of the plastic panels P and to convey a stack of the plastic panels P safely and reliably. At the door assembling station, the necessary functional parts and devices such as the window regulator R, the harness H, etc are installed to the plastic mounting panel P with the access opening covers 22 and 23 left joined. The assembling work of the functional parts and devices is quite easily achieved as described previously. Subsequently, the plastic mounting panel P with the functional parts and devices installed thereto is installed to the door panel sub-assembly D. Specifically, after fitting the plastic mounting panel P into the aperture 3 of the inner panel D1, the door latch unit 33 is secured to the inner panel D1. Thereafter, the window glass W is inserted into the door panel sub-assembly D and is coupled to the window regulator R through the access opening 12. In the next step, the handle linking cable 31 is connected to the exterior door handle 7 through the access opening 13.

After completing the installation of the plastic mounting panel P. the access opening covers 22 and 23 are separated from the plastic mounting panel P and fitted into the access openings 13 and 12, respectively, to cover up the access openings 13 and 12. Finally, the trim unit T is installed to the door panel semi-assembly D to cover the plastic panel, so as thereby to complete the front door Because the plastic mounting panel P with the access opening covers 22 and 23 appendant thereto by breakable joints 20 and 21, respectively, can be formed as one piece, large molding equipment and a great quantity of molding material can be put to effective and efficient use and the productivity of the plastic panels is increased.

The location of the access opening covers 22 and 23 to the plastic mounting panel P is at the cutaway corner, the plastic mounting panel P is so formed to have a generally rectangular flat configuration which is efficient This provides the injection mold with a simple configuration Moreover, the plastic panels P are easily and stably piled up and safely conveyed.

The access opening covers 22 and 23 are separated from the plastic mounting panel P after having installed the plastic mounting panel P to the door panel subassembly D and having attached the exterior door handle 7 and the window glass W to the door panel sub-assembly D, it is not feared that the access covers 22 and 23 are missing before assembling such as during conveyance thereof.

Although the above embodiment has been d ed to the plastic panel formed with the access opening covers as appendant pans to the plastic panel, the appendant pieces are not limited to the access opening covers as long as the appendant parts are formed as integral parts of the plastic panel and installed to the plastic panel after separation.

It is to be understood that although the present invention has been described with regard to a preferred embodiment thereof, various other embodiments and variants may occur to those skilled in the art, which are within the scope and spirit of the invention, and such other embodiments and variants are intended to be covered by the following claims.

What is claimed is:

1. A vehicle door comprising an outer door panel, an inner door panel formed with an aperture, and a mourning panel to which functional devices of the vehicle door and door parts are installed and which is installed to the inner door panel to cover up the aperture of the inner door panel, said mounting panel comprising:

a plastic panel formed in conformity with the aperture of the inner door panel;

a plastic structural part appendant to said plastic panel; and a breakable joint connecting said plastic structural part to said plastic panel;

wherein said plastic panel, said plastic structural part and said joint are formed as one piece and said part is separated from said plastic panel by brig away said joint from said plastic panel during installing work of said mounting panel to said inner door panel;

and wherein said plastic structural part is one of said door parts that is installed to said mounting panel.

2. A vehicle door as defined in claim 1, wherein said plastic panel is formed with an opening for an access to an inside of the vehicle door for assembling the vehicle door, said opening being covered by said plastic structural part when said plastic structural part is installed to said plastic panel after installation of said plastic panel to the inner door panel.

3. A vehicle door as defined in 1, wherein said inner door panel has a substantial wall section forming part of a side wall of a passenger compartment of the vehicle and said plastic structural part before separation from said plastic panel occupies a location where said plastic structural part overlaps said substantial wall section when said mounting panel is installed.

4. A vehicle door as defined in claim 3, wherein said plastic structural part is one of said door parts that is installed to said mounting panel.

5. A vehicle door as defined in claim 4, wherein said plastic panel is formed with an opening for an access to an inside of the vehicle door for assembling the vehicle door, said opening being covered by said structural part installed to the plastic panel after installation of said plastic panel to the inner door panel.

6. A vehicle door as defined in claim 5, wherein said strums part is formed with ribs operative to absorb shocks from the outer door panel.

* * * * *

UNITED STATES PATENT AND TRADEMARK OFFICE
CERTIFICATE OF CORRECTION

PATENT NO.     : 6,449,907 B2
DATED          : September 17, 2002
INVENTOR(S)    : Ikuo Nishikawa et al.

It is certified that error appears in the above-identified patent and that said Letters Patent is hereby corrected as shown below:

Column 11,
Line 36, "mourning" should read -- mounting --.

Column 12,
Line 8, "brig" should read -- breaking --.
Line 39, "strums" should read -- structural --.

Signed and Sealed this

Twenty-fifth Day of February, 2003

JAMES E. ROGAN
*Director of the United States Patent and Trademark Office*